Sept. 5, 1933.  I. H. JUDD  1,925,535
VEHICLE TRANSPORT
Filed March 7, 1932  5 Sheets-Sheet 1
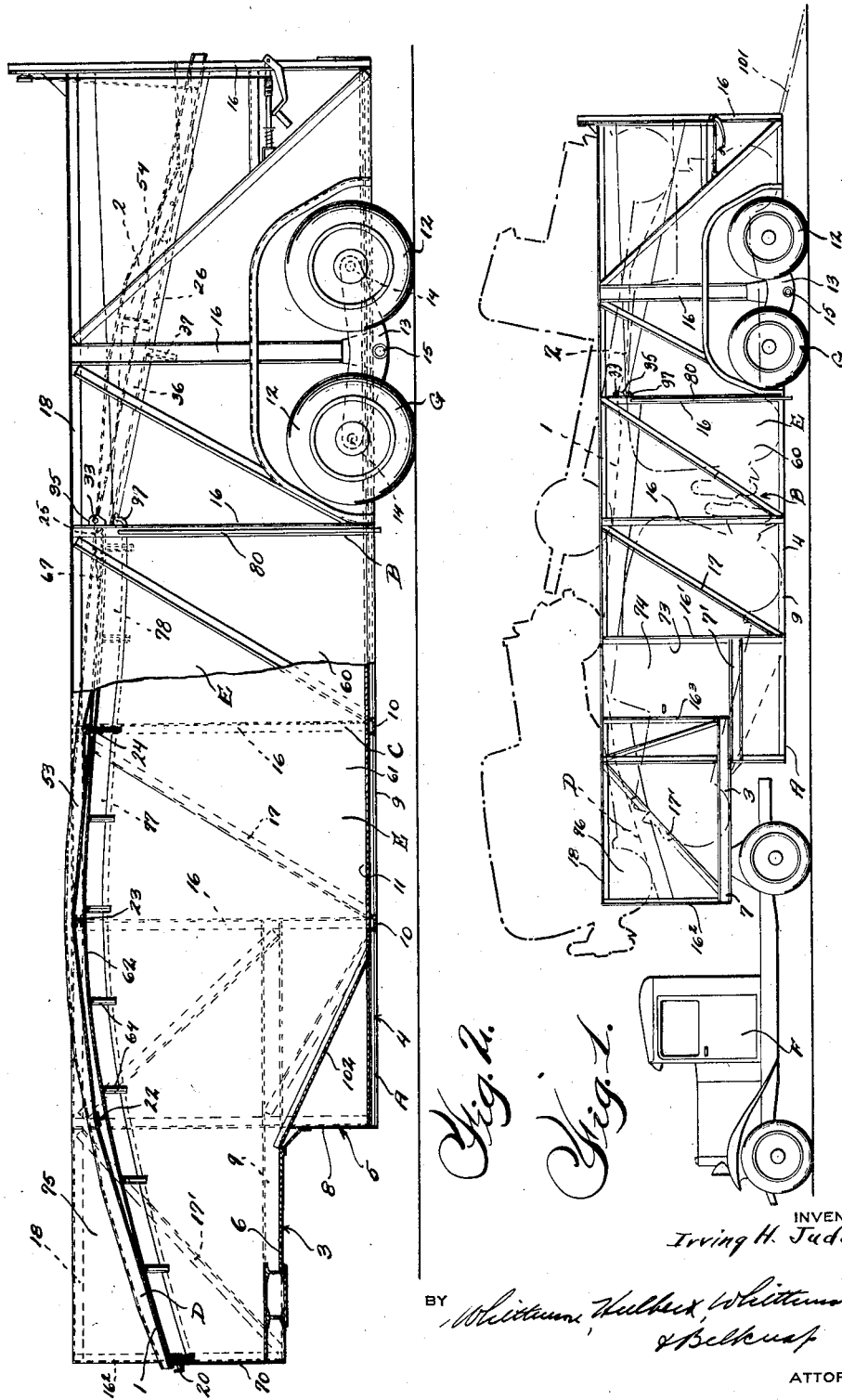
INVENTOR
Irving H. Judd
BY
ATTORNEYS Sept. 5, 1933.  I. H. JUDD  1,925,535
VEHICLE TRANSPORT
Filed March 7, 1932  5 Sheets-Sheet 2

INVENTOR
Irving H. Judd
BY
ATTORNEYS

Sept. 5, 1933.   I. H. JUDD   1,925,535
VEHICLE TRANSPORT
Filed March 7, 1932   5 Sheets-Sheet 3
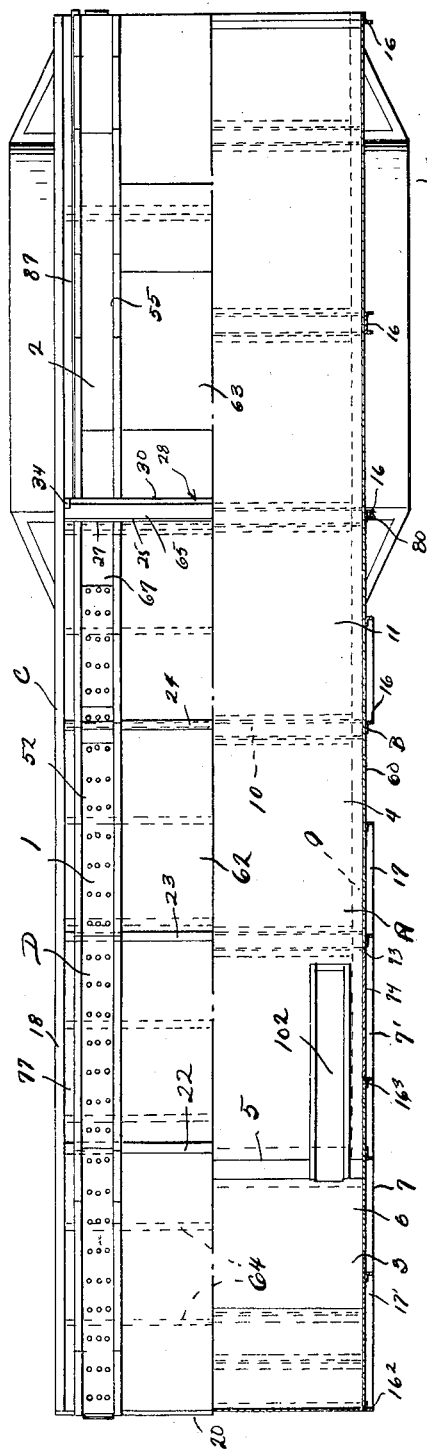
INVENTOR
Irving H. Judd
BY
ATTORNEYS

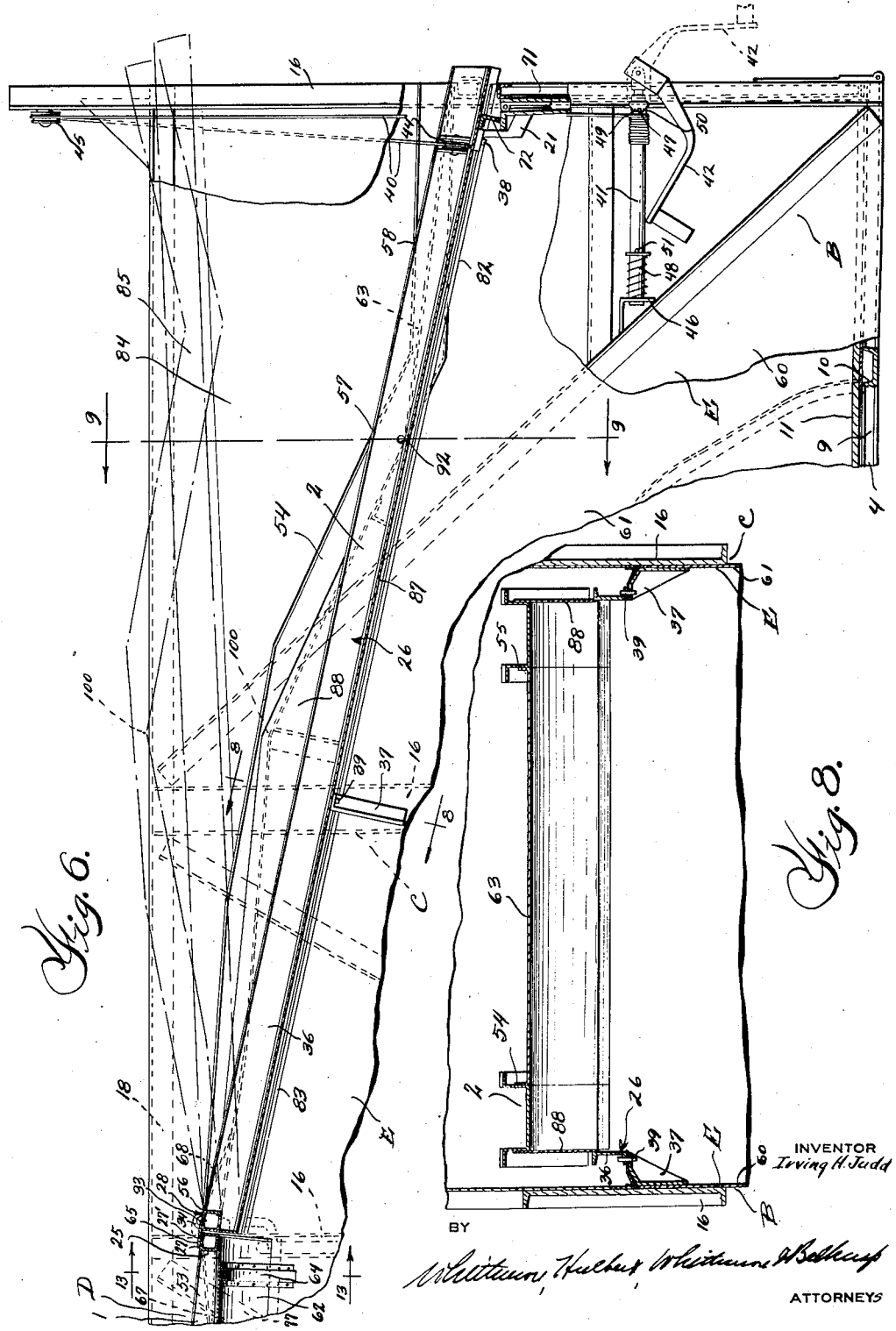

Sept. 5, 1933.     I. H. JUDD     1,925,535
VEHICLE TRANSPORT
Filed March 7, 1932     5 Sheets-Sheet 5
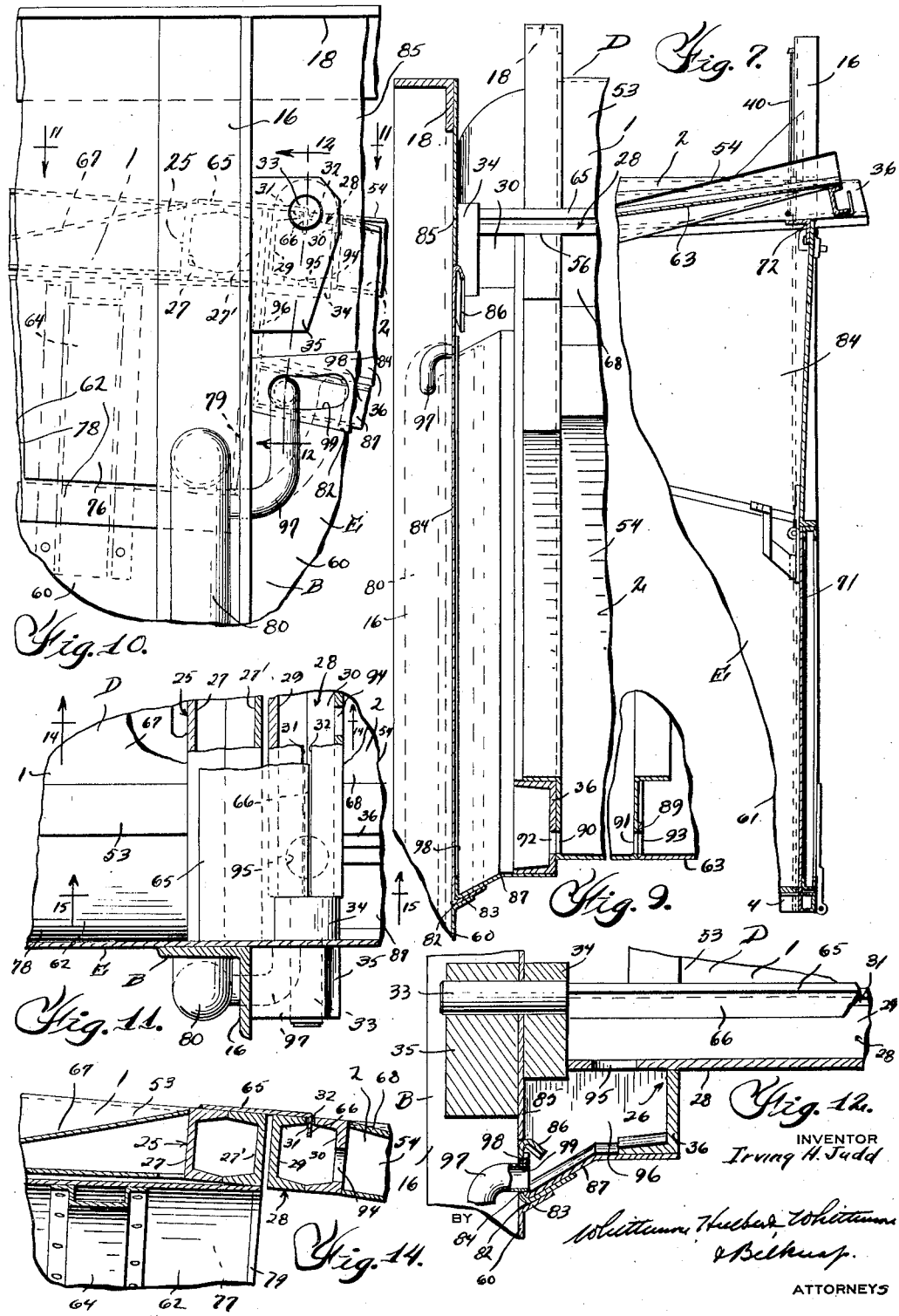
INVENTOR
Irving H. Judd Patented Sept. 5, 1933

1,925,535

UNITED STATES PATENT OFFICE 1,925,535

VEHICLE TRANSPORT

Irving H. Judd, Detroit, Mich., assignor to Whitehead & Kales Company, River Rouge, Mich., a corporation of Michigan Application March 7, 1932. Serial No. 597,382

8 Claims. (Cl. 296—1)

This invention relates generally to vehicle transports and consists of certain novel features of construction, combinations and arrangements of parts, that will be hereinafter more fully described and particularly pointed out in the appended claims.

One of the essential objects of the invention is to provide a transport of the type described wherein four automobiles may be carried within a space of predetermined size.

Another object is to provide a transport wherein the means for carrying automobiles referred to is preferably in the form of upper and lower decks which may be conveniently loaded.

Another object is to provide a transport wherein the upper deck may be loaded from either end.

Another object is to provide a transport wherein the major portion of the lower deck is substantially straight and is disposed between walking beams at opposite sides of the vehicle in a substantially horizontal plane above a single transversely extending axle connected to said beams and beneath tandem wheel spindles carried by said beams.

Another object is to provide a transport wherein the straight portion aforesaid of the lowered deck is preferably rigid throughout its length with the chassis frame of the transport and is constructed and arranged in such a manner that automobiles may be driven in substantially a straight line from the rear end of the transport over the rear axle between the walking beams to a point adjacent the forward end of the transport.

Other objects, advantages and novel details of construction of this invention will be made more apparent as this description proceeds, especially when considered in connection with the accompanying drawings, wherein:

In the accompanying drawings:

Figure 1 is a side elevation of a semi-trailer coupled to a truck and showing by dot and dash lines the positions that may be assumed by automobiles when loaded upon the trailer;

Figure 2 is an enlarged elevational view of the semi-trailer partly in section;

Figure 4 is a section on the line 4—4 of Figure 3;

Figure 5 is a front elevation of the semi-trailer;

Figure 6 is a longitudinal sectional view through the trailer at the rear end thereof with parts broken away, showing by full lines the lowered position of the pivotal section of the upper track and showing by dotted lines the raised position thereof;

Figure 7 is another longitudinal sectional view through the trailer at the rear end thereof and showing the tail gate sections closing the space between the flooring of the lower deck and the raised pivotal section of the upper deck;

Figure 8 is a sectional view taken on the line 8—8 of Figure 6;

Figure 9 is a sectional view taken on the line 9—9 of Figure 6;

Figure 10 is an enlarged elevation of the trailer at the joint between the fixed and pivotal sections of the upper deck;

Figure 11 is a horizontal sectional view taken on the line 11—11 of Figure 10;

Figure 12 is a vertical sectional view through the hinge construction taken substantially on the line 12—12 of Figure 10;

Figure 13 is a sectional view taken on the line 13—13 of Figure 6;

Figure 14 is a sectional view taken on the line 14—14 of Figure 11;

Figure 15 is a sectional view taken on the line 15—15 of Figure 11.

Figure 3:
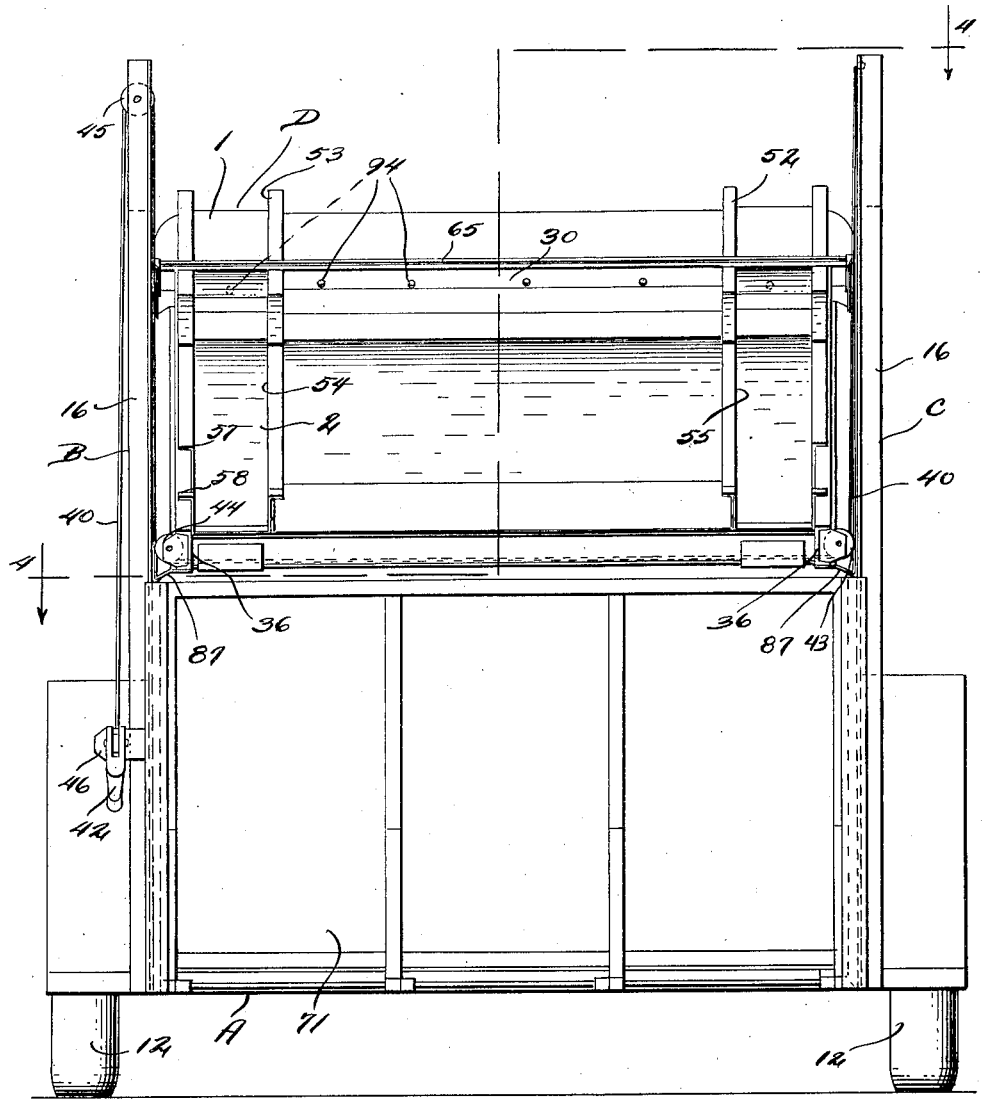
Figure 3 is a rear end elevation of the trailer.

Referring now to the drawings, A is the chassis; B and C respectively are vertical frames on the chassis; D is a track or upper deck between the frames B and C and having a fixed section 1 and hinged section 2; and E is a body between the frames B and C.

As shown, the chassis A is of the drop frame type and comprises the upper and lower horizontal portions 3 and 4 respectively and the intermediate vertical portion 5. Preferably the upper frame portion 3 is provided from its forward end to the vertical portion 5 with a flooring 6, and includes two laterally spaced longitudinally extending channel members or beams 7 that project in rear of the vertical portion 5. The upright portion 5 is covered by an apron 8. The lower portion 4 comprises the longitudinally and transversely extending structural members 9 and 10 respectively and is provided throughout its length with a flooring 11. Any suitable means may be used to couple the upper portion 3 of the trailer to a towing vehicle such as a motor truck F, while a tandem wheel structure G is preferably utilized for supporting the trailer at the rear end thereof. In order that the longitudinal members 9 may be as low as possible between the wheels 12 the tandem wheel structure G preferably comprises a pair of elongated rockers 13 provided at opposite ends with laterally projecting stub shafts 14 for the wheels 12 and pivotally mounted intermediate their ends on a shaft 15 located beneath and extending across the longitudinally extending member 9 of the horizontal portion 4.

The frames B and C are substantially parallel and extend from one end to the other of the chassis at the longitudinal edges thereof. Preferably each frame comprises the vertical members 16, 16', 16² and 16³ respectively, diagonal members 17 and 17' and a top rail 18. As shown, the rails 18 extend from one end to the other of the trailer in substantially parallel relation to the horizontal portions 3 and 4 respectively; the vertical members 16 and 16' extend between the longitudinally extending members 9 and the rails 18; the vertical members 16² extend between the beams 7 and the rails 18, and the vertical member 16³ extends between a horizontal member 7' terminally secured to two of the vertical members 16 of the frame B at the rear end of one of the beams 7. The diagonal members 17 extend between the rails 18 and the longitudinally extending members 9, while the diagonal members 17' extend between the beams 7 and the rails 18. A bar 20 of channel formation extends across and is rigidly secured to the forward uprights 16² at points substantially midway of their ends, while brackets 21 are rigidly secured to the rear uprights 16 at points substantially midway between the flooring 11 and rails 18.

Preferably the track or upper deck D extends from one end to the other of the trailer and is adapted to receive automobiles from either end. The fixed section 1 inclines upwardly from the forward cross bar 20 to the upper ends of the vertical members 16' and thence downwardly to the vertical members 16 just in advance of the hinged section 2. Cross bars 22, 23, 24 and 25 respectively, rigid with the vertical members 16 and 16' of the frames B and C support section 1 of the track and also serve as tie members between the frames B and C. The hinged section 2 constitutes a rearward extension of the fixed section 1 and is carried by a frame 26. Preferably the rear cross bar 25 comprises two channel members 27 and 27' respectively that open toward each other and have their longitudinal edges abutting and welded together. Opposite ends of said channels 27 and 27' are rigid with two of the uprights 16. Likewise the forward cross bar 28 of the frame 26 comprises two channel members 29 and 30 respectively that open toward each other and have their lower longitudinal edges welded together. The upper longitudinal edges 31 and 32 respectively of the channel members 29 and 30 are spaced apart, preferably in alignment with stub shafts 33 pivotally engaging blocks 34 welded to opposite ends of the cross bar 28 and carried by blocks 35 welded to the adjacent uprights 16. The longitudinal members 36 of the frame 26 project rearwardly from the cross bar 28 in substantially parallel relation to each other and are adapted to rest upon the brackets 21 when the pivoted track section 2 is in lowermost position. Other brackets 37 are secured to intermediate uprights 16, while pins 38 and 39 respectively project downwardly from the longitudinally extending members 36 of the frame and are engageable with suitable openings in the brackets 21 and 37 to maintain the upright frames B and C in proper spaced relation. Any suitable means such as the cable 40, drum 41 and handle 42 may be used to raise and lower the rear end of the hinged section 2. As shown, the cable 40 is fixed to one of the vertical members 16 at the upper end thereof and is trained about suitable sheaves 43, 44 and 45 respectively carried by the frame 26 and adjacent vertical members 16 and is wound upon and terminally secured to the drum 41. Preferably this drum is mounted for rotary and longitudinal movements in a bracket 46 and adjacent upright member 16 and carries a pin 47 that is normally held by a spring 48 in engagement with spaced lugs 49 and 50 respectively rigid with the vertical member 16 so that the drum 41, cable 40 and hinged section 2 will be held against movement. As shown, the spring 48 is sleeved upon the drum 41 between the bracket 46 and a stop 51 on the drum and constantly urges the latter to the right. However, the spring 48 may be compressed and the pin 47 may be removed from the lugs 49 and 50 when the handle 42 connected to the drum is pressed by hand to the left and is turned to raise or lower the section 2. When the handle 42 is released the spring 48 will immediately restore the pin 47 in engagement with the lugs 49 and 50. Preferably the fixed section 1 of the track comprises a pair of laterally spaced flanged channels 52 and 53 respectively that rest upon and are secured to the cross bars 20, 22 and 23 respectively, are recessed to receive cross bar 24 and abut and are welded to the cross bar 25. The pivoted section 2 of the track preferably comprises a pair of laterally spaced flanged channels 54 and 55 respectively that are arranged between the longitudinally extending members 36 of the frame 26. As shown, portions 56, 57 and 58 respectively of the outer flanges of said channels rest upon and are secured to the longitudinal members 36 of the frame. Between the portions 56 and 57 the track is arched upwardly relative to the longitudinal members 36 of the frame 26 while between the portions 57 and 58 the track is depressed relative to said longitudinally extending members 36.

The body E is preferably formed of sheet metal and includes the side sections 60 and 61 and the roof sections 62 and 63. As shown, the side sections 60 and 61 are upon the inner sides of and are secured to the frames B and C, while the roof sections 62 and 63 respectively are arranged just beneath the track D and constitute a flooring upon which the drivers of the automobiles carried by the track may walk before or after leaving such automobiles. Preferably the roof section 62 is rigid with the side sections 60 and 61 and is reinforced by stiffening bars 64, while the roof section 63 is rigid with the inner sides of the track channel members 54 and 55 respectively and is movable therewith. In order that the space between the cross bars 25 and 28 may be closed at all times I have provided a strip 65 of sheet metal that is preferably welded upon the upper face of the cross bar 25 and has a depending flange 66 received between the spaced longitudinal edges 31 and 32 respectively of the channel sections 29 and 30. Since the space between the edges 31 and 32 of the channel sections are in axial alignment with the stub shafts 33 it will be apparent that the flanged portion 66 will remain between the edges 31 and 32 regardless of the position of the frame 26 to the cross bar 25. Located in advance of the cross bar 25 are ramps 67 that are secured in the track channels 54 and 55 and incline upwardly from the bases of the latter to the upper forward edges of the cross bar 25. Likewise ramps 68 incline downwardly from the upper rear edges of the cross bar 28 to the bases of the channels 54 and 55 respectively of the pivoted track section 2. For closing opposite ends of the body I have provided an apron 70 that extends from the cross bar 20 to the flooring 6 between the upright frames B and C, and a sectional tail gate 71 that is hingedly connected to the rear end of the chassis and is adapted to be connected to a cross bar 72 upon the lower side of the frame 26 when the latter is in raised position.

As illustrated in Figure 1, a doorway 73 is provided in the siding 60 upon the upright frame B to enable the drivers of automobiles being loaded or unloaded to leave or enter the trailer. As shown, this doorway is above the horizontal member 7' and between the uprights 16³ and 16'. Any suitable means such as the door 74 may be used to close the doorway 73.

At opposite sides of the roof section 62 between the forward cross bar 20 to the cross bar 25 are side sections 75 and 76 respectively that constitute upward extensions of the side sections 60 and 61 and are secured to the rails 18, thus affording protection to portions of the automobiles upon the upper track D. It will also be noted that the upper sections 75 and 76 cooperate with the roof section 62 to form gutters 77 and 78 respectively for the drainage of water, etc. Closures 79 are provided for the rear ends of the gutters 77 and 78, while pipes 80 lead from these gutters to points adjacent the ground for receiving and carrying off the water from the gutters.

Between the cross bar 28 and the brackets 21 upon the rear uprights, the side sections 60 and 61 have inclined upper edges 82 which extend downwardly from points just below the cross bar 28 to points just above the brackets 21 and have inwardly and upwardly extending flanges 83. Side sections 84 and 85 respectively constitute upward extensions of the side sections 60 and 61 and are arranged in overlapping relation (see Figure 7). As shown, the lower sections 84 are secured to the flanges 83 and to the side frames B and C, while the upper sections 85 are secured to the rails 18 and lower sections 84 and are provided at their lower edges with inwardly and downwardly inclined flanges 86. Secured to the lower faces of the longitudinally extending members 36 of the frame 26 are laterally projecting gutters 87 that slide upon the inner faces of the lower sections 84 as the frame 26 is raised and lowered and are alternately engageable with the flanges 86 and 83 respectively. Between the portions 56 and 57 (Figure 6) aprons 88 extend from the outer sides of the channel members 54 and 55 of the track to the longitudinally extending members 36 of the frame 26. For drainage purposes the sides of the channel members 54 and 55 of the track, the longitudinally extending members 36 of the frame, and the flanges 89 of the roof section 63 are provided with aligned openings 90, 91, 92 and 93 respectively so that water may flow into the gutters 87. Likewise openings 94 are provided at spaced points of the rear wall of the channel section 30 of the cross bar 28 so that water from the channel members 54 and 55 of the track, and roof section 63 between the track channels may enter the cross bar 28 and flow through openings 95 at opposite ends thereof into the gutters 87. Closures 96 are provided for the forward ends of the gutters 87, while pipes 97 of flexible material lead from the outer sides of the gutters to the pipes 80. As shown, the pipes 97 are rigid with the side walls 98 of the gutters and are movable in arcuate slots 99 in the side sections 84 when the pivoted track section 2 is raised or lowered. Thus when the hinged track section 2 is in raised position (see dotted line position of Figure 6) water on the roof section 63 and in the track channels 54 and 55 from the arched portion 100 to the forward end thereof will flow upwardly through the openings 94 into the cross bar 28 and thence through the openings 95 into the gutters 87, while water on the roof section 63 and in the track channels 54 and 55 in rear of the arched portion 100 will flow through the openings 93, 91, 90 and 92 respectively to the gutters 87, and the water received in the gutters 87 will be discharged through the pipes 97 and 80 respectively to the ground. When the section 2 is in lowered position (see full line position of Figure 6) the water on the roof section 63, in the channels 54 and 55 of the track, and in the gutters 87 is free to flow from the rear ends thereof on to the ground.

In use the hinge section 2 may be raised to the dotted position illustrated in Figure 6 so that an automobile to be carried may be run up suitable skids 101 on to the flooring 11 and thence up inclined channel guides 102 to the flooring 6. The driver of that automobile may then leave the trailer through the doorway 73. One other automobile may then be backed on to the flooring 11, so that the engine thereof is at the rear of the trailer while in transit. The hinged section 2 may then be lowered on to the brackets 21 and two automobiles may be loaded on to the track D. This may be accomplished in either of two ways, i. e., the truck F constituting the towing vehicle for the trailer may be moved in a position at substantially right angles to the trailer so skids may be applied to the forward end of the track in which event one of the automobiles to be loaded may be driven up said skids on to the inclined portion 1 of the track or such automobile may be backed up skids fastened to the rear end of the hinged section 2 to said inclined portion. One other automobile may then be driven up the skids at the rear on to the track. The automobiles are then in a position to be transported and any suitable means (not shown) may be utilized for holding the same against movement while in transit. In this connection it will be noted that the track D is perforated, consequently such track not only affords better traction for the tires of the automobiles being loaded and enables lighter weight metal to be used in the construction thereof, but also enables adjustable chock blocks and hold-down devices (not shown) to be adjustably fastened thereto. Inasmuch as the body sides 60 and 61, roof sections 62 and 63, aprons 8 and 70 and tail gate 71 completely enclose the lower deck of the trailer the automobiles on the floorings 11 and 6 will be completely protected. When automobiles are not being carried on the lower deck, for instance on the return trip, merchandise and freight of almost any description may be carried thereon instead and will be covered and protected, the same as in a freight car.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. A transport including a vehicle having a chassis, upright side frames upon the chassis throughout substantially its entire length, and means above said chassis and between said frames for carrying a plurality of vehicles, including a track having a fixed section extending upwardly and rearwardly from one end of said frames at a point substantially midway between the upper and lower edges thereof to a point adjacent said upper edges and thence downwardly and rearwardly and having a hinged section constituting an extension of the fixed section, and flooring having stepped portions below the track, the lower step being beneath the hinged and fixed sections aforesaid, and the upper step being beneath the fixed section only of said track.

2. In a semi-trailer equipped with tandem wheels having spindles, the combination of a chassis frame between said tandem wheels, upright side frames carried by the chassis frame at opposite sides thereof, a pivoted deck for supporting automobiles carried by said upright frames, and means for supporting automobiles beneath said pivoted deck including a lower deck carried by and rigid with the chassis frame between the upright frames and beneath the tandem wheel spindles.

3. In a semi-trailer equipped with tandem wheels having spindles, the combination of a chassis frame between said tandem wheels, upright side frames upon said chassis frame, an upper deck for carrying automobiles carried by said side frames and provided at its rear end with a pivoted section, and a lower deck carried by and rigid with the chassis frame between the upright frames, said lower deck being provided beneath the pivoted section of the upper deck with a substantially straight portion that extends throughout substantially the entire length of the chassis frame in a substantially horizontal plane and beneath the tandem wheel spindles.

4. In a semi-trailer equipped with a transversely extending axle, walking beams on the axle at opposite ends thereof, and tandem wheel spindles projecting outwardly from said beams, the combination of a chassis frame between said walking beams, upright side frames carried by the chassis frame, an upper deck for carrying automobiles carried by said upright side frames, and means for carrying automobiles located beneath the upper deck between the walking beams, said means being above the axle but beneath the tandem wheel spindles and rigid throughout its length with the chassis frame, whereby automobiles may be loaded upon and unloaded from said means beneath the upper deck without movement of said means.

5. In a semi-trailer equipped with a transversely extending axle, walking beams on the axle at opposite ends thereof, and tandem wheel spindles projecting outwardly from said beams, the combination of a chassis frame between said walking beams, upright side frames upon said chassis frame, an upper deck for carrying automobiles carried by said side frames, and a lower deck carried by the chassis frame beneath the upper deck, said lower deck being between the walking beams above the axle but beneath the tandem wheel spindles.

6. In a semi-trailer equipped with a transversely extending axle, walking beams mounted upon said axle at opposite ends thereof, and tandem wheel spindles projecting outwardly from said walking beams, the combination of a chassis frame between the walking beams, uprights at opposite sides of said chassis frame, an upper automobile supporting deck carried by said uprights and provided at its rear end with a pivoted portion that is movable above said axle, and a lower deck carried by the chassis frame between said uprights, the major portion of said lower deck being in a substantially horizontal plane between the walking beams above the axle and beneath the tandem wheel spindles and being rigid relative to the chassis frame and uprights whereby automobiles may be loaded upon and unloaded from said lower deck without movement of any portion of said lower deck when the pivoted portion aforesaid of the upper deck is elevated.

7. In a semi-trailer equipped with a transversely extending axle, walking beams mounted upon said axle at opposite ends thereof, and tandem wheel spindles projecting outwardly from said walking beams, the combination of a chassis frame between the walking beams, uprights at opposite sides of said chassis frame, an upper automobile supporting deck carried by said uprights and provided at its rear end with a pivoted portion that is movable above said axle, and a lower automobile supporting deck carried by the chassis frame between the uprights, a portion of the lower deck from the rear end thereof to a point in advance of the pivoted portion of the upper deck being straight and disposed between the walking beams above the axle and beneath the wheel spindles.

8. In a semi-trailer equipped with a transversely extending axle, walking beams mounted upon said axle at opposite ends thereof, and tandem wheel spindles projecting outwardly from said walking beams, the combination of a chassis frame between said walking beams, a lower automobile supporting deck extending longitudinally of the chassis frame between said walking beams, a portion of said lower deck being above the axle but below the wheel spindles, said portion being substantially straight throughout its length whereby the forward and rear wheels of an automobile may be carried in substantially a common horizontal plane fore and aft of the axle, uprights at opposite sides of the chassis frame, and an upper automobile supporting deck carried by said uprights in such spaced relation to the lower deck that at least two automobiles may be loaded onto and unloaded from the lower deck beneath the upper deck without movement of any portion of said lower deck.

IRVING H. JUDD.